(12) United States Patent
Loewen

(10) Patent No.: US 7,012,209 B2
(45) Date of Patent: Mar. 14, 2006

(54) METHOD OF GOLD SEPARATION AND GOLD SEPARATION DEVICE

(76) Inventor: Wayne W. Loewen, 11 Belmont Drive, St. Albert, Alberta (CA) T8N 0C3

(*) Notice: Subject to any disclaimer, the term of this patent is extended or adjusted under 35 U.S.C. 154(b) by 0 days.

(21) Appl. No.: 10/707,843

(22) Filed: Jan. 16, 2004

(65) Prior Publication Data

US 2005/0155911 A1 Jul. 21, 2005

(51) Int. Cl.
*C25C 1/22* (2006.01)
*B03C 1/30* (2006.01)

(52) U.S. Cl. ............................ 209/127.1; 209/127.2; 209/128; 209/130; 209/131; 209/12.2; 516/921; 516/922

(58) Field of Classification Search ..... 209/127.1–130, 209/45, 46, 49, 50
See application file for complete search history.

(56) References Cited

U.S. PATENT DOCUMENTS

| | | | | |
|---|---|---|---|---|
| 756,223 A * | 4/1904 | Fahrig | ........................ | 205/345 |
| 4,019,971 A * | 4/1977 | Crites | ........................ | 209/178 |
| 4,111,688 A * | 9/1978 | Ichijo | ........................ | 75/714 |
| 4,860,874 A | 8/1989 | Winderl | | |
| 4,975,182 A | 12/1990 | Barefoot | | |
| 5,240,618 A * | 8/1993 | Caldwell et al. | ............ | 210/748 |
| 5,660,735 A * | 8/1997 | Coltrinari et al. | ............ | 210/723 |
| 5,927,508 A * | 7/1999 | Plath | ............................ | 209/40 |
| 6,555,010 B1 * | 4/2003 | Barrett | ........................ | 210/710 |

* cited by examiner

*Primary Examiner*—Donald P. Walsh
*Assistant Examiner*—Jonathan R. Miller
(74) *Attorney, Agent, or Firm*—John J. Elnitski, Jr.

(57) ABSTRACT

A method of collecting gold by flowing water over a gold collecting medium located in a sluice to induce a positive surface charge on the gold collecting medium. Feeding gold laden material into the sluice with the flowing water to induce a negative surface charge on gold particles of the gold laden material and create a slurry. Setting the flow rate of the slurry into the sluice such that the gold particles are attracted to the gold collecting medium. Finally, collecting the gold particles attracted to the gold collecting medium from the gold collecting medium. A gold separation device having a sluice having an input end and an output end; a water input directed into the input end of the sluice; and a gold collecting medium in the sluice. The gold collecting medium being of a material which incurs a positive surface charge when immersed in water.

15 Claims, 3 Drawing Sheets

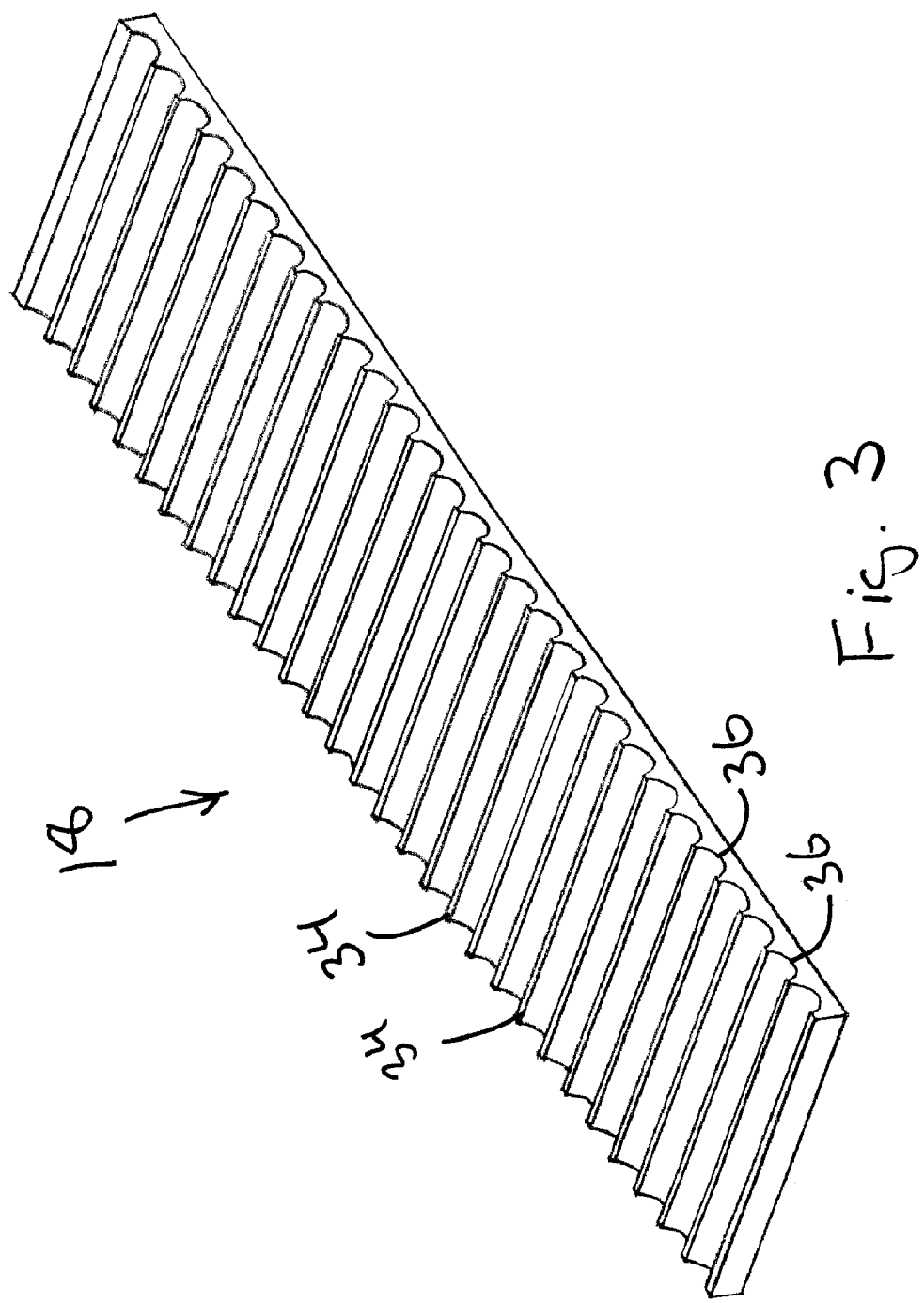

METHOD OF GOLD SEPARATION AND GOLD SEPARATION DEVICE

BACKGROUND OF INVENTION

The present invention generally relates to gold separation devices. More specifically, the present invention relates to the separation small particles of gold from gold laden materials.

Colloidal gold is defined as metallic gold that is of a small enough particle size that it remains in suspension indefinitely in a liquid, but it is not dissolved in the liquid. For instance if you shine a laser light through a liquid with colloidal gold, the light will bounce off the gold particles and show the path of the light ray through the liquid. The colloidal gold is usually found adhered to other materials referred to as gold laden material. The colloidal gold is so fine that hand panning it clean from other materials is not an option, as the gold would merely wash away. There are several know methods of collecting colloidal gold. Some of these methods involve using hazardous materials such as mercury. Other methods use magnetic elements or involve several steps to process the gold.

It is an object of the present invention to provide device and method of attracting small particles of colloidal gold from gold laden materials in a safe and efficient manner.

SUMMARY OF INVENTION

A method of collecting gold by flowing water over a gold collecting medium located in a sluice to induce a positive surface charge on the gold collecting medium. Feeding gold laden material into the sluice with the flowing water to induce a negative surface charge on gold particles of the gold laden material and create a slurry. Setting the flow rate of the slurry into the sluice such that the gold particles are attracted to the gold collecting medium. Finally, collecting the gold particles attracted to the gold collecting medium from the gold collecting medium. A gold separation device having a sluice having an input end and an output end; a water input directed into the input end of the sluice; and a gold collecting medium in the sluice. The gold collecting medium being of a material which incurs a positive surface charge when immersed in water.

BRIEF DESCRIPTION OF DRAWINGS

FIG. 3 is a perspective view of a mat according to the present invention.

DETAILED DESCRIPTION

The present invention is a method and a gold separation device for collecting colloidal gold. Colloidal gold incurs a negative surface charge when immersed in surface waters having a PH value in a range between 4 and 8. This true for both fresh water or saltwater. There are materials in which positive charges are induced on the surface of such materials, when the materials are immersed in water having a PH value range between 4 and 8. The colloidal gold is attracted to the material with the induced positive charges while in the water. The method creates an environment for gold separation from gold laden materials using water and materials which become positively charged in the water. The material which become positively charged in the water becomes a gold collecting medium in the water. Most surface freshwater has a PH value of about 7.2. By providing a material that incurs a positive charge in water, gold can be separated and collected from gold laden materials by washing the gold laden materials with water over the collecting medium of positively charged material. The method does not require the use of chemicals for the separation of the gold from other minerals, thereby providing an environmentally friendly process. The process has shown near one-hundred percent high efficiency in the recover of gold particles from gold laden materials.

The method of the present invention is most effective on particles of the gold of a finer than 20-mesh screen size. 20-mesh screen size is defined as particles which will pass through a screen having 20 openings per inch. A 20-mesh screen will allow particles of about a sixteenth of an inch or less to pass. Particles of gold over the 20-mesh size can be easily separated using gravity, whereby the particles of gold under the 20-mesh size cannot. Weight ratios for gravity separation no longer work effectively for particles of gold in the size range between the 20-mesh size down to 0 microns. Colloidal gold is of a particle size in a range of one to one thousand-five hundred microns, which is less than the 20-mesh size. By washing gold laden materials less than the 20-mesh sized with water, such as gravel, over a positively charged gold collecting medium immersed in water allows for collection of gold from the gold laden particles. The negatively charged gold clings to the gold collecting medium and the non-gold materials wash away as waste material. Thereby, leaving a highly concentrated gold product that is ready for final processing. The concentrate of gold is so pure, that the gold can be placed in a crucible and smelted to pure gold in a specialized turbo smelter.

Figure 1:
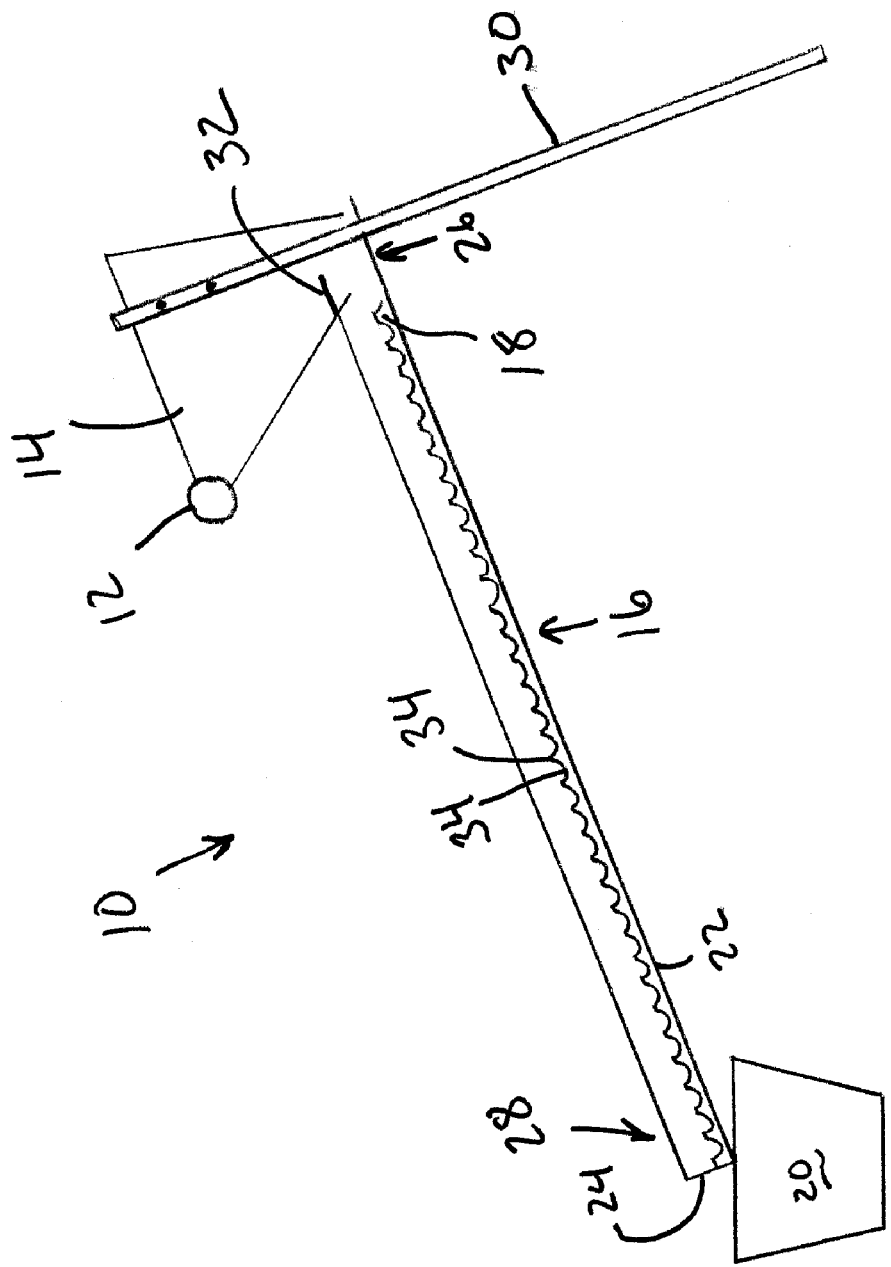
FIG. 1 is a side view of a gold separation device according to the present invention.
Figure 2:
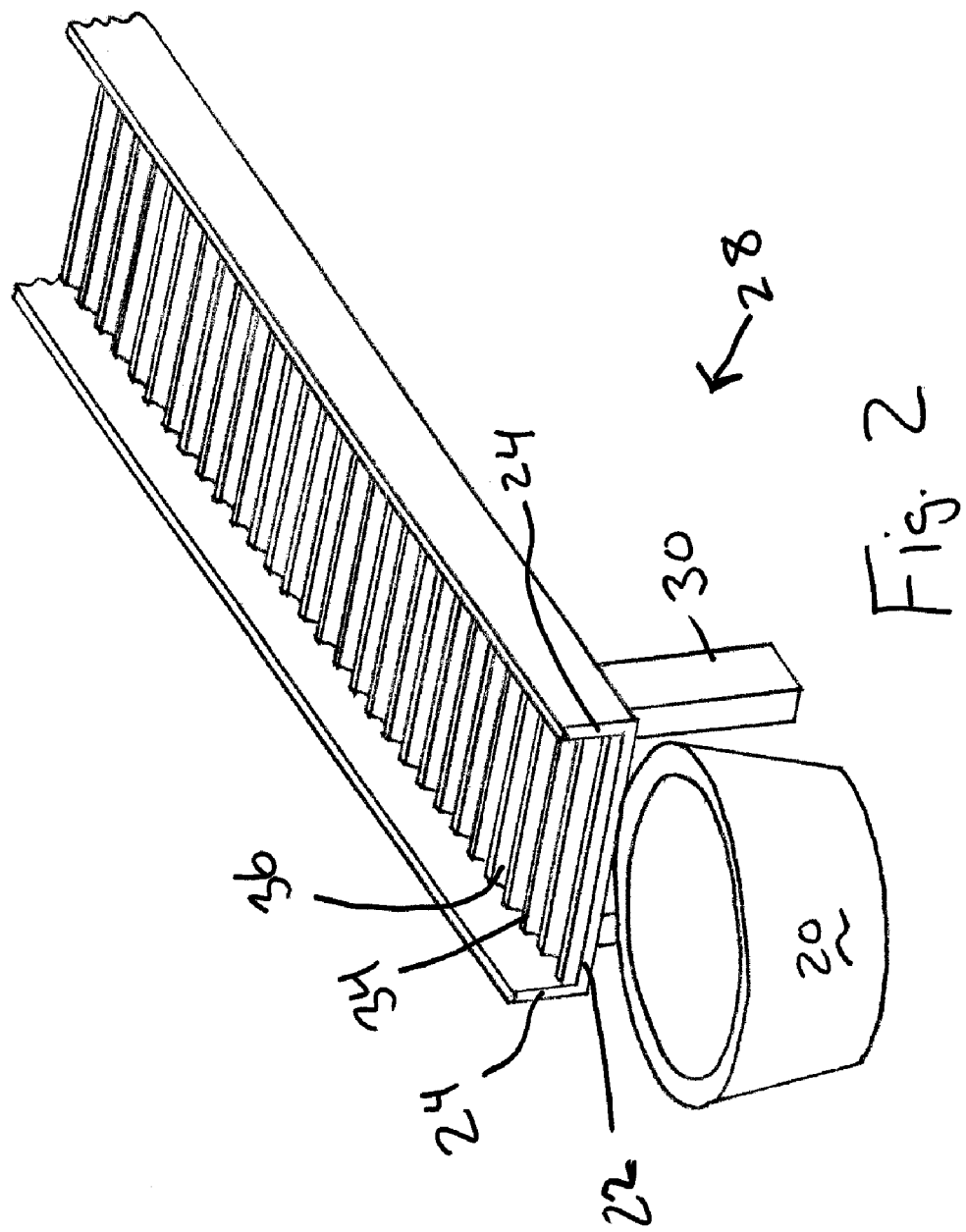
FIG. 2 is a perspective view of a gold separation device according to the present invention.

FIGS. 1–2 show a gold separation device 10 for the separation of gold from gold laden materials. The gold separation device 10 includes a water input 12, hopper 14, sluice 16, gold collecting medium 18 and collection pail 20. The sluice 16 includes a support surface 22 with two sides 24 in a trough like shape. The sluice 16 includes an input end 26 and an output end 28. There are legs 30 extending downward from the input end 26 to support the sluice 16. The hopper 14 is positioned above the input end 26 of the sluice 16. There is an adjustable gate valve 32 at the bottom of the hopper 14 to control flow rate into the sluice 16. The water input 12 leads into the hopper 14. The collection pail 20 is positioned at the output end 28 of the sluice 16. The output end 28 of the sluice 16 is open to allow flow into the collection pail 20. The output end 28 of the sluice 16 can also include support legs 30, as shown in FIG. 2. A typical size for the sluice 16 is ten feet in length and is four inches wide with one-and-one-half inch high sides 24. Note, the input end 26 of the sluice 16 is higher than the output end 28 of the sluice 16 to cause flow from the hopper 14 to the collection pail 20. The gold collecting medium 18 lays on top of the support surface 22 of the sluice 16. The gold collecting medium 18 is a material which incurs a positive charge when immersed in water, especially water having a PH value between 4 to 8. FIG. 3 shows the gold collecting medium 18 as a ribbed mat having ribs 34 and grooves 36 between the ribs 34. The grooves 36 between the ribs 34 are used to collect the gold separated from the gold laden material and protect the collected gold from being knocked loose from the gold collecting medium 18 and being swept away by water flow and waste material. Plastics, especially vinyl, are a good choice for the gold collecting medium 18.

The method of separating the colloidal gold using the gold separation device is as follows. Gold laden feed material is screened through a 20-mesh screener. Pressurized water is fed by a pump into the water input 12 which leads into the hopper 14. Flow of the water into the input end 26 of the sluice 16 is controlled by the gate valve 32 of the hopper 14. The gate valve 32 is adjusted to allow the hopper 14 to remain about half full of water while processing for gold. The screened gold laden feed material is introduced wet or dry into the hopper 14 with the water at a rate that does not allow back up of the exit of the hopper 14 into the sluice 16. The slurry of water from the water input 12 and screened gold laden feed material should remain thin with a high ratio of water versus feed material. A good ratio would be nine parts water to one part screened gold laden feed material. Backup of the hopper 14 can be prevented by keeping up a turbulent action over the grooves 36 of the gold collecting medium 18 and not feeding the slurry too quickly into the sluice 16, which can also plug the grooves 36. Feeding the hopper 14 too quickly with gold laden feed material will tend to cause the gold laden feed material to slide through suspended on excess gold laden feed material. With the right flow rate, the gold can be observed settling out during the process, as most of the gold will collect in first three feet of the sluice 16 from the input end 26. The ten foot length of the sluice 16 allows a safety margin for gold collection to prevent gold from escaping the sluice 16 and falling into the collection pail 20. The collection pail 20 is used to collect the waste material. The colloidal gold will appear as a brown sludge in sluice 16, as each gold particle is so tiny the particles cannot be readily distinguished as separate particles by the naked eye without magnification. Once all the gold laden feed material has been passed through the hopper 14, time should be allowed for the sluice 16 to be clear of all the waste material. The water is then turned off. The collection pail 20 is removed and an empty cleanup pail is placed at the output end 28 of the sluice 16. The cleanup pail can simply be a clean empty collection pail 20. The sluice 16 is then sprayed down with jets of high speed spray water to wash the collected clinging gold concentrate free from the gold collecting medium 18 into the cleanup pail. Care must be taken that the cleanup pail does not overflow, as ultrafine gold can be lost in the spillover. Next, allow time for the gold to settle in the cleanup pail and remove the water. The gold concentrate can then be placed in a smelting vessel with flux and smelted to clean gold.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

What is claimed is:

1. A method of collecting minus 20 mesh gold using a sluice including a gold collecting medium, comprising:
    using water having a PH range between 4 and 8;
    flowing the water over the gold collecting medium in a to induce a positive surface charge on the gold collecting medium due to the interaction between the water and the gold collecting medium;
    feeding minus 20 mesh gold laden material into the sluice with the flowing water to induce a negative surface charge on minus 20 mesh gold particles of the colloidal gold laden material and create a slurry of minus 20 mesh gold laden material and water, whereby the water induces a negative surface charge on the minus 20 mesh gold particles;
    setting the flow rate of the slurry into the sluice such that the minus 20 mesh gold particles are attracted to the gold collecting medium; and
    collecting the minus 20 mesh gold particles from the gold collecting medium that were attracted to gold collecting medium.

2. The method of claim 1, wherein the minus 20 mesh gold particles are one-sixteenth of inch or less in size.

3. The method of claim 1, wherein the gold collecting medium is a plastic material.

4. The method of claim 1, wherein the gold collecting medium is a vinyl material.

5. The method of claim 1, wherein the gold collecting medium includes ribs and grooves between the ribs.

6. The method of claim 5, wherein the gold collecting medium is a vinyl material.

7. The method of claim 5, wherein the gold collecting medium is a plastic material.

8. A gold separation device for collecting minus 20 mesh gold particles, comprising:
    a sluice having an input end and an output end, said input end for receiving water of a PH range between 4 and 8, and said output end for releasing said water;
    a water input directed into said input end of said sluice; and
    a gold collecting medium in said sluice between said input end and said output end, said gold collecting medium being of a material which incurs a positive surface charge when immersed in water due to the interaction between the water and the gold collecting medium.

9. The gold separation device of claim 8, further including a hopper between said water input and said input end of said sluice.

10. The gold separation device of claim 9, further including a gate valve between said hopper and said input end of said sluice to control flow into said sluice.

11. The gold separation device of claim 8, wherein said gold collecting medium is plastic.

12. The gold separation device of claim 8, wherein said gold collecting medium is vinyl.

13. The gold separation device of claim 8, wherein said gold collecting includes ribs and grooves between said ribs.

14. The gold separation device of claim 8, further including a hopper between said water input and said input end of said sluice; and wherein said gold collecting includes ribs and grooves between said ribs.

15. The gold separation device of claim 14, wherein said gold collecting medium is vinyl.

* * * * *